(12) United States Patent
Endres

(10) Patent No.: US 7,031,818 B2
(45) Date of Patent: Apr. 18, 2006

(54) METHOD AND DEVICE FOR RECOGNISING A STATE OF STANDSTILL OF A MOTOR VEHICLE

(75) Inventor: Franz-Josef Endres, Sessenhausen (DE)

(73) Assignee: Lucas Automotive GmbH, (DE)

( * ) Notice: Subject to any disclaimer, the term of this patent is extended or adjusted under 35 U.S.C. 154(b) by 0 days.

(21) Appl. No.: 10/444,685

(22) Filed: May 23, 2003

(65) Prior Publication Data

US 2003/0208308 A1    Nov. 6, 2003

Related U.S. Application Data

(63) Continuation of application No. PCT/EP01/13432, filed on Nov. 20, 2001.

(30) Foreign Application Priority Data

Nov. 23, 2000   (DE) ................. 100 58 071

(51) Int. Cl.
*G06F 19/00*   (2006.01)
*G01C 21/00*   (2006.01)
*G01C 17/38*   (2006.01)

(52) U.S. Cl. ............... 701/70; 701/38; 701/217; 701/220; 340/936; 340/988; 340/995.28; 340/429; 73/1.75

(58) Field of Classification Search ............. 701/70, 701/94, 93, 38, 107, 217, 220, 221; 340/936, 340/988, 995.25, 995.28, 429, 441; 73/1.75, 73/1.79
See application file for complete search history.

(56) References Cited

U.S. PATENT DOCUMENTS

| | | | |
|---|---|---|---|
| 4,717,207 A | | 1/1988 | Kubota et al. ............. 303/3 |
| 5,667,282 A | | 9/1997 | Kim ............................ 303/3 |
| 5,820,515 A | * | 10/1998 | Fukaya et al. ............. 477/92 |
| 5,991,692 A | * | 11/1999 | Spencer et al. ............ 701/217 |
| 6,113,515 A | * | 9/2000 | Salecker et al. ........... 477/72 |
| 6,411,868 B1 | * | 6/2002 | Tiede et al. ................. 701/1 |

(Continued)

FOREIGN PATENT DOCUMENTS

| | | |
|---|---|---|
| DE | 36 18 532 | 2/1992 |
| DE | 195 03 270 | 8/1996 |

(Continued)

*Primary Examiner*—Thomas E. Black
*Assistant Examiner*—Brian J. Broadhead
(74) *Attorney, Agent, or Firm*—McMillan, Sobanski & Todd, LLC

(57) ABSTRACT

It is customary to use signals from a motor vehicle central control in order to operate braking equipment for motor vehicles which automatically produces braking forces for states of standstill of a motor vehicle which are capable of holding a motor vehicle at a standstill. The signals which are provided by the central control are used to determine whether or not the motor vehicle is at a standstill. It is consequently also necessary to operate the central control during a state of standstill for the motor vehicle in order to produce the required braking forces. The braking equipment can no longer be operated as desired if the central control fails or malfunctions. These problems are solved by the invention, which provides standstill recognition for motor vehicles which enables braking equipment which automatically produces braking forces during standstill to be automatically controlled.

29 Claims, 3 Drawing Sheets

U.S. PATENT DOCUMENTS

| | | | |
|---|---|---|---|
| 6,411,881 B1 * | 6/2002 | Thomas | 701/67 |
| 6,738,703 B1 * | 5/2004 | Ewinger et al. | 701/70 |
| 2001/0029409 A1 * | 10/2001 | Tiede et al. | 701/1 |
| 2003/0136191 A1 * | 7/2003 | Tsuji | 73/384 |
| 2003/0214185 A1 * | 11/2003 | Kinder et al. | 303/192 |

FOREIGN PATENT DOCUMENTS

| | | |
|---|---|---|
| EP | 0 812 747 | 12/1997 |
| FR | 2 713 573 | 6/1995 |
| GB | 2 297 619 | 8/1996 |

* cited by examiner

METHOD AND DEVICE FOR RECOGNISING A STATE OF STANDSTILL OF A MOTOR VEHICLE

CROSS REFERENCE TO RELATED APPLICATIONS

This application is a continuation of International Application No. PCT/EP01/13432 filed Nov. 20, 2001, the disclosures of which are incorporated herein by reference, and which claimed priority to German Patent Application No. 100 58 071.8 filed Nov. 23, 2000, the disclosures of which are incorporated herein by reference.

FIELD OF THE INVENTION

The invention relates to a method and a device for recognising whether or not a motor vehicle is at a standstill. The invention relates in particular to a method and a device for recognising the state of standstill of a motor vehicle on the basis of changes of inclination such as, e.g. pitching movements, of the motor vehicle. The invention also relates to braking equipment for motor vehicles and methods for operating this equipment in which braking forces are produced when states of standstill are recognised.

BACKGROUND OF THE INVENTION

In order to operate many electrically and electronically controlled motor vehicle mechanisms, actual operating states of a motor vehicle must be established so as to activate these electrically and electronically controlled mechanisms accordingly. For example, in the case of motor vehicles with braking equipment which, when the motor vehicle is in a state of standstill, automatically produces braking forces which hold the motor vehicle at a standstill, it is necessary to ascertain whether or not the vehicle is at a standstill. Examples of braking equipment of this kind are so-called electronic parking brakes (EPB) and electronic holding brakes (EFB).

As other electrical and electronic mechanisms of the motor vehicle also require information on actual operating states of the motor vehicle (e.g. travelling mode, standstill), it is usual to fall back on this information when operating the above-mentioned braking equipment. The operating state information comprises parameters which characterise the actual operating state of the vehicle. These include the speed, the acceleration, the transverse acceleration, the engine speed, the effective driving torque, the speed of one or more wheels, positions of the accelerator, brake and clutch pedals, etc.

As operating state information of this kind is generally provided by a central control of the motor vehicle, when using this information for braking equipment which is to hold the motor vehicle in a state of standstill using automatically produced braking forces, the central control and the sensors associated with the latter must also be operated when the motor vehicle is not (i.e. its ignition is not turned on). This results in an increased power consumption, which—especially where lengthy standstill periods are concerned—may cause the power supply of the motor vehicle (car battery) to discharge, so that the motor vehicle cannot be started up. Moreover, when employing this procedure, mechanisms which are controlled by the central control should not be operated while the motor vehicle is at a standstill, although the central control is in operation to control the braking equipment. Measures of this kind, which are intended to prevent additional power consumption as well as wear and damage, represent an additional expenditure.

It is also impossible in this case for the braking equipment to be controlled so as to produce braking forces when the motor vehicle is in a state of standstill if the central control, corresponding sensors connected to the latter and/or data transmission mechanisms for the braking equipment are not operating faultlessly or fail completely.

DE 36 18 532 A1, and corresponding U.S. Pat. No. 4,717,207 which is incorporated by reference herein, establishes whether a motor vehicle is at a standstill by checking whether the actual travelling speed is zero, the clutch is released, first or reverse gear is engaged and the actual angle of inclination of the motor vehicle corresponds to or is greater than a predetermined angle of inclination. If these conditions are fulfilled, the brake actuating pressure, which is predetermined at this instant by the vehicle driver by means of the brake pedal, is maintained by means of a valve which is disposed between the master brake cylinder and the wheel brake cylinders of the braking system described in this publication. The disadvantage in this case lies in the fact that no braking forces are produced without actuating the brake pedal when at a standstill if a transition to standstill has taken place without using the brake pedal. Moreover, the device described here does not enable braking forces required for standstill to be produced if the motor vehicle is not operated at all, i.e. if the ignition is turned off when at a standstill. Braking forces required for the vehicle to be at a standstill must accordingly be produced in a different way in this case, for example by actuating the hand brake or the brake pedal.

According to U.S. Pat. No. 5,820,515 a state of standstill of a motor vehicle is detected in that it is checked by using detection means whether the vehicle speed is substantially 0, whether the accelerator pedal is not actuated and whether the braking pedal is actuated. If this is the case, according to U.S. Pat. No. 5,820,515 it is established therefrom that the motor vehicle is in a state of standstill. Following this it is ascertained whether the vehicle is on an inclined road. No changes of the position of the motor vehicle are detected in this connection but merely the position in which the vehicle is in the state of standstill. A further difference with respect to the present invention results from the fact that the detection of the position in the state of standstill is not utilised to ascertain whether the vehicle is in the state of standstill. The detection of the position of the vehicle is rather performed once it has been found in the above manner that the vehicle is in the state of standstill.

According to U.S. Pat. No. 5,667,282 a detection of a state of standstill of a motor vehicle in the actual sense of the word does not take place. According to U.S. Pat. No. 5,667,282 the state of standstill of the vehicle is rather indicated in that the driver operates a parking brake switch 30. Only once the state of standstill is indicated in this manner is an inclination sensor activated establishing the inclination of the vehicle and hence the inclination of the road. Comparable to U.S. Pat. No. 5,820,515, in U.S. Pat. No. 5,667,282 as well no changes in the inclination or position of the vehicle are detected but merely the inclination in the state of standstill.

SUMMARY OF THE INVENTION

An object of the invention is to provide a method and a device which enables states of standstill of a motor vehicle to be recognised independently of any operation of a central control of this vehicle. The purpose of this procedure is to prevent increased power requirements, as described above, when the motor vehicle is at a standstill and measures which are necessary in connection with mechanisms of the motor vehicle not required when at a standstill and to increase reliability in the recognition of a state of standstill.

In order to achieve the underlying object, the invention provides a method and a device for recognising a state of standstill of a motor vehicle as well as braking equipment for a motor vehicle and a method for operating this equipment in which states of standstill of a motor vehicle are recognised in a manner according to the invention.

In the method according to the invention for recognising a state of standstill of a motor vehicle at least one change of position parameter is specified which defines a change of position of a motor vehicle which may occur in a travelling state. An actual change of position of the motor vehicle is subsequently detected and at least one actual change of position parameter, which defines the detected actual change of position, subsequently established for each operating state of the motor vehicle in which a standstill recognition is to be carried out. The actual change of position parameter, of which there is at least one, is compared with the specified change of position parameter, of which there is at least one, for the real standstill recognition in order to determine whether the at least one actual change of position parameter indicates a travelling state for the motor vehicle.

If the at least one actual change of position parameter characterises a travelling state for the motor vehicle, a signal is generated which indicates that the motor vehicle is moving and is not at a standstill. In contrast, a signal which characterises a state of standstill for the motor vehicle is generated if the at least one actual change of position parameter indicates that the motor vehicle is at a standstill. In this connection a state of standstill is understood to mean a state of the motor vehicle in which the latter should not exhibit or adopt any travelling state.

When specifying the at least one change of position parameter, it is preferable to define at least one change of position parameter range which characterises changes of position of the motor vehicle which may occur in travelling states. In this case the at least one actual change of position parameter is compared with the corresponding change of position parameter range, or a corresponding one of the change of position parameter ranges, in order to ascertain whether the at least one actual change of position parameter lies in the corresponding change of position parameter range. If the actual change of position parameter(s) does/do not lie in the corresponding change of position parameter range, the standstill signal is generated, while the signal which indicates a travelling state for the motor vehicle is generated if the actual change of position parameter(s) fall(s) in the corresponding change of position parameter range.

In a preferred embodiment the at least one change of position parameter is specified such that it (they) define(s) changes of inclination of the motor vehicle about its longitudinal and/or transverse axis. Actual changes of inclination are accordingly detected when the actual change of position of the motor vehicle is detected and these changes compared with the specified changes of inclination.

A further measure lies in generating an actual change of position signal, preferably an actual change of inclination signal, when the actual change of position of the motor vehicle is detected, this signal reproducing the actual change of position or inclination of the motor vehicle. In this case the actual change of position parameter is established from the actual change of position signal or the actual change of inclination signal.

In order to establish the at least one actual change of position parameter from the actual change of position signal, the actual change of position signal can be low-pass filtered or high-pass-filtered or band-pass-filtered.

The actual change of position signal can be low-pass-filtered and subsequently high-pass-filtered or high-pass-filtered and subsequently low-pass-filtered instead of being band-pass-filtered. This procedure has the advantage of enabling filters having different characteristics to be used for the low-pass filtering and high-pass filtering. It is thus possible, for example, to predetermine different scanning rates and amplification factors for the low-pass and high-pass filtering.

The actual change of position signal or a filtered actual change of position signal can be filtered differentially as an alternative or in addition to the above-mentioned filtering processes. An appropriate/Appropriate change of position parameter(s) is/are accordingly to be specified for the comparison which is to be carried out. In this respect it is possible to specify one or more differential quantities as change of position parameters which define changes with time of changes of position of the motor vehicle which may occur in a travelling state. A further measure in this respect consists in establishing one or more differential quantities from the at least one specified change of position parameter.

One or more of the above-mentioned filtering processes is preferably carried out recursively. In this case the (filtered) actual change of position signal and a previously established (filtered) actual change of position signal are taken as a basis for establishing the actual change of position parameter.

The device according to the invention for recognising a state of standstill of a motor vehicle comprises a change of position recognition mechanism and a computer unit. The change of position recognition mechanism serves to detect an actual change of position of a motor vehicle and to generate a corresponding change of position signal. The actual change of position signal is evaluated by means of the computer unit by obtaining from the actual change of position signal at least one actual change of position parameter and comparing this with at least one previously specified change of position parameter which defines changes of position of a motor vehicle which may occur in a travelling state. The computer unit generates a signal which reproduces a state of standstill or a travelling mode for the motor vehicle in accordance with this comparison.

The computer unit generates a standstill signal if the at least one actual change of position parameter, compared with the at least one specified change of position parameter, indicates that the motor vehicle is at a standstill rather than in a travelling mode. On the other hand, the computer unit delivers a signal which characterises a travelling mode of the motor vehicle if the comparison of the change of position parameters indicates that the motor vehicle is in a travelling mode.

The change of position recognition mechanism preferably comprises an inclination sensor by means of which changes of inclination of the motor vehicle about the latter's longitudinal and/or transverse axis are detected. In this case an actual change of inclination signal is generated by the change of position recognition mechanism.

According to a further feature, the computer unit comprises a band-pass filter which filters the actual change of position signal. Instead of the band-pass filter, the computer unit may comprise a low-pass filter which receives the actual change of position signal and a high-pass filter which receives a low-pass-filtered signal from the low-pass filter or a high-pass filter which receives the actual change of position signal and a low-pass filter which receives a filtered signal from the high-pass filter.

The computer unit may also comprise just a high-pass filter or a low-pass filter, depending on the application of the device according to the invention.

In further embodiments of the device according to the invention the computer unit may comprise a differential filter which differentially filters the actual change of position signal or one of the signals filtered by the band-pass filter or the low-pass filter and/or high-pass filter.

When using a high-pass filter and a low-pass filter, it is preferable to select different scanning rates and/or amplification factors for these.

The invention also provides a method for operating braking equipment of a motor vehicle which, when the motor vehicle is in a state of standstill, automatically produces braking forces which hold the motor vehicle at a standstill. In order to recognise whether or not the motor vehicle is at a standstill, one of the methods according to the invention which are described above is used for standstill recognition.

As regards the braking equipment according to the invention for a motor vehicle which automatically provides braking forces required for a state of standstill in this vehicle, one of the devices according to the invention which are described above is used for the standstill recognition required for this.

BRIEF DESCRIPTION OF THE DRAWINGS

The accompanying figures are referred to in the following description, in which figures.

DETAILED DESCRIPTION OF THE INVENTION

Figure 1:
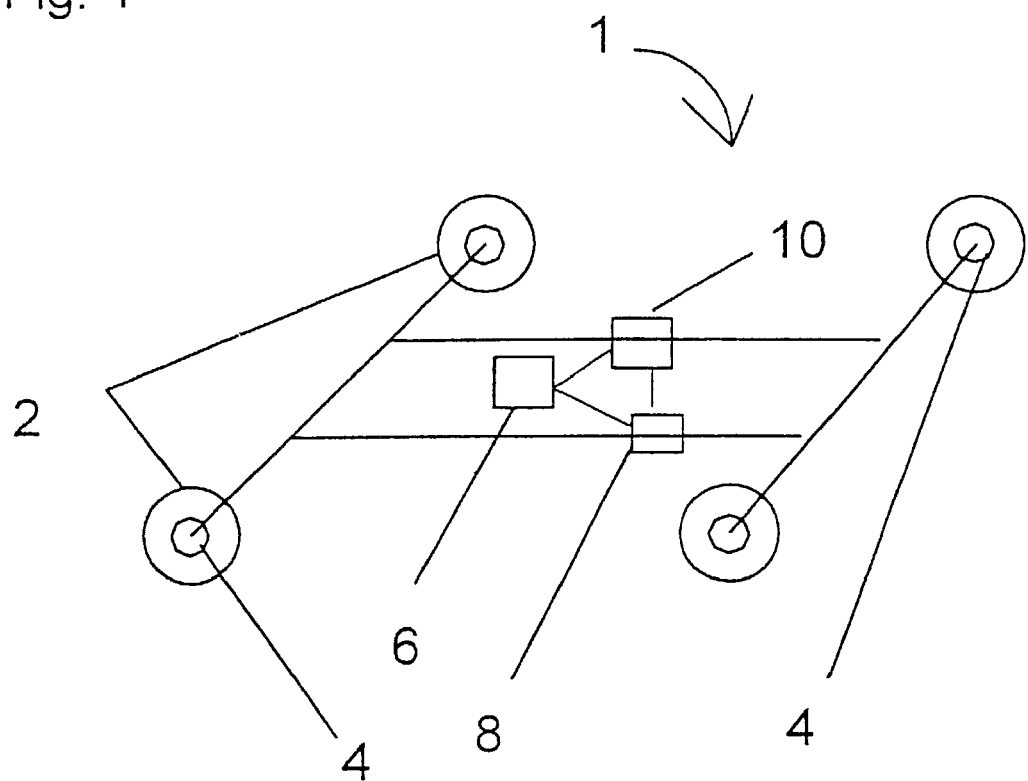
FIG. 1 is a schematic representation of a motor vehicle with a device according to the invention for standstill recognition.

When in travelling mode, i.e. at a vehicle speed differing from zero, a motor vehicle generally exhibits dynamic movements about its transverse axis and its longitudinal axis which are characteristic of the travelling mode. It is consequently not only possible to ascertain whether or not a motor vehicle is at a standstill when the latter exhibits no movements of any kind, but also when movements of the motor vehicle do not correspond to the movements which are typical of the travelling mode.

Should a standstill only be recognised for a motor vehicle upon a standstill recognition taking place when the motor vehicle exhibits no movements of any kind, it would not be possible to recognise states of standstill for the motor vehicle if the latter were moving due to external influences, although not being in a travelling mode. This is the case, for example, when motor vehicles are transported by means of a lorry, a ship or a railway train.

This may result in detected vehicle movements not caused by a travelling mode being interpreted as the vehicle not being at a standstill, in particular when using standstill recognition to operate braking equipment of a motor vehicle which is to hold the motor vehicle at a standstill by automatically producing appropriate braking forces. The braking equipment would accordingly be deactivated, so that the braking forces required for a state of standstill would no longer be produced. The motor vehicle may as a result automatically start moving and roll away during transport, for example.

This is prevented by evaluating detected vehicle movements in accordance with dynamic movements which are caused by a travelling mode. If the detected vehicle movements lie in a range in which vehicle movements typical of a travelling mode may lie, it is to be assumed that the motor vehicle is not at a standstill. On the other hand, it may be ascertained that the motor vehicle is at a standstill if the detected vehicle movements do not lie in the range of movements which are typical of travel.

Depending on the type of motor vehicle, the movements which are caused by a travelling mode differ in frequencies, amplitudes and directions with regard to the longitudinal and transverse axes of a motor vehicle. Movements of a motor vehicle which are typical of a travelling mode can accordingly be characterised by way of their frequencies, their amplitudes and their directions.

Frequency and/or amplitude ranges are to be specified when defining frequencies and amplitudes of movements typical of a travelling mode. One definition of limit frequencies and/or limit amplitudes for typical travelling movements of a motor vehicle results in established vehicle movements whose frequencies and/or amplitudes exceed the corresponding limit value being interpreted as travelling movements. This means that in the case of a standstill recognition for a motor vehicle whose movements are thus interpreted, detected vehicle movements produced by external influences and untypical of a travelling mode would indicate a travelling mode which is actually non-existent. An example of this is the transport of motor vehicles by means of a railway train, in which there is a possibility of the occurrence of high-frequency movement components for the motor vehicle, or on a ship, which may cause high-amplitude vehicle movements.

When specifying frequency and/or amplitude ranges of vehicle movements which are typical of a travelling mode, it is in particular necessary also to take account of vehicle movements which seldom occur during a normal travelling mode. Examples of these are travelling states in which a motor vehicle is powerfully braked (emergency braking, full braking) and powerfully accelerated (quick start). These also include travelling states in which the motor vehicle is specifically moved in an untypical way such as, e.g. when attempting to start a motor vehicle which is stuck in snow or in soft subsoil.

It is also necessary in these cases to prevent a motor vehicle from being activated or remaining activated in travelling states of this kind when using standstill recognition to operate braking equipment which is automatically activated when the vehicle is at a standstill. It may therefore be necessary to specify a plurality of frequency and/or amplitude ranges for vehicle movements in travelling mode.

The above-mentioned considerations are also to be taken into account when defining movement directions and/or movement direction ranges with regard to longitudinal and transverse vehicle axes.

The following description is based on a type of motor vehicle which exhibits dynamic movements about its transverse axis at a frequency of approximately 1 Hz when in a normal travelling mode. This type of vehicle may also exhibit dynamic movements about its transverse axis for rarely occurring travelling states at a frequency of up to 4 Hz. For the sake of simplicity movements of this type of vehicle about its longitudinal axis are not taken into account in the following illustration of standstill recognition, even if the intention is to use movements about the longitudinal axis for standstill recognition.

As represented in FIG. 1, a motor vehicle, which is designated as a whole by 1, comprises brakes 4 associated with wheels 2. The brakes 4 are controlled by means of a control unit 6 such that, in addition to conventional braking for travelling states of the motor vehicle 1, they also produce braking forces when the motor vehicle 1 is at a standstill which are required to hold the motor vehicle 1 at a standstill. In this case individual or several of the brakes 4 may be activated by the control unit 6 in order to maintain the state of standstill.

An inclination sensor 8, which is associated with the control unit 6, is used to ascertain whether or not the motor vehicle 1 is at a standstill. The inclination sensor 8 may also be replaced, in different regions of the motor vehicle 1, by a plurality of inclination sensors or sensors, which are capable of detecting vehicle movements and/or changes of vehicle movements.

The inclination sensor 8 (or comparable, suitable mechanisms) may in this connection be operated continuously, at predetermined instants or during predetermined periods. Particularly where an electrically/electronically operated/controlled inclination sensor 8 is concerned, measures must be taken to ensure that its scanning frequency fulfils the Nyquist criterion in accordance with the specified frequency range for vehicle movements in travelling states.

A computer unit 10, which may be integrated as a component into the control unit 6 or constructed separately from the latter, is used to evaluate signals from the inclination sensor 8 which indicate that the motor vehicle 1 is actually inclined. The functions of the computer unit 10 described in the following may also be provided by the control unit 6.

Figure 2:
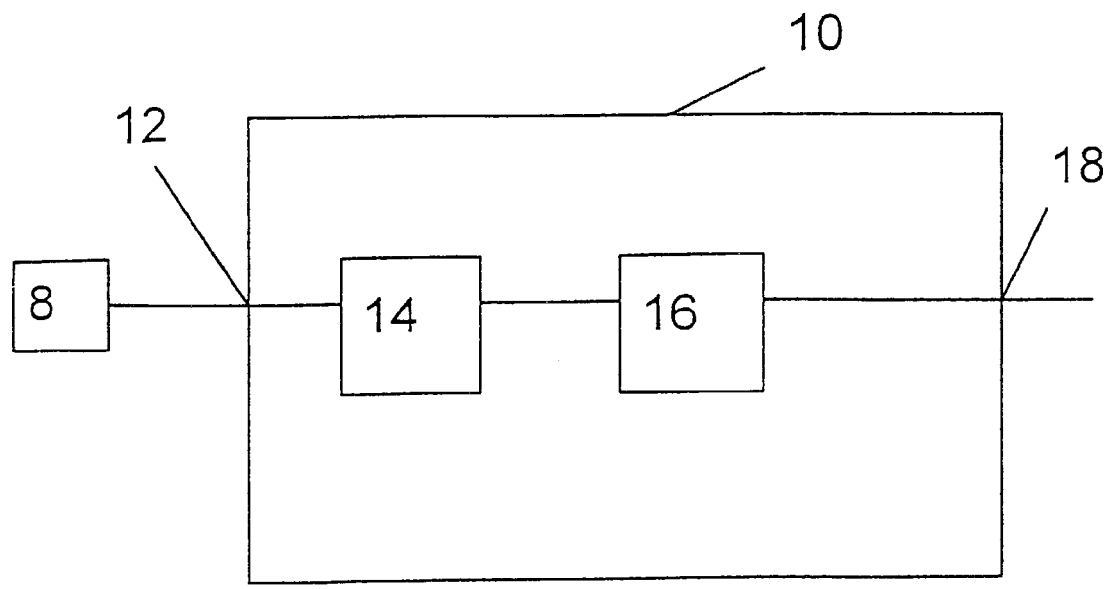
FIG. 2 is an embodiment of a device according to the invention for standstill recognition with a band-pass filter.

In the embodiment of the computer unit 10 which is shown in FIG. 2 this is connected via an input 12 to the inclination sensor 8 in order to receive the latter's signal Inc_act indicating the actual motor vehicle inclination.

The received signal Inc_act (i.e. the actual inclination) is filtered by means of a band-pass filter 14 such that the band-pass filter 14 delivers a signal Inc_f_bp (i.e. band-pass-filtered inclination in the frequency range) which can only comprise frequency components of the signal Inc_act of the inclination sensor 8 which lie in the frequency range defined for vehicle movements in travelling mode. Taking the conditions illustrated above as a basis, the lower cut-off frequency of the band-pass filter 14 lies somewhat below 1 Hz, while the upper cut-off frequency of the band-pass filter 14 is approximately 4 Hz.

The filtered signal Inc_f_bp is transmitted to an evaluation mechanism 16, which ascertains whether the signal Inc_f_bp of the band-pass filter 14 comprises frequencies in the range between approximately 1 Hz and 4 Hz. If no frequency components which lie in this frequency range are detected in the signal Inc_f_bp, the evaluation mechanism delivers a signal Stat_con (i.e. state of standstill) which indicates that the motor vehicle 1 is at a standstill. The signal Stat_con is transmitted via an output 18 of the computer unit 10 to the control unit 6.

In response to the signal Stat_con, the control unit 6 activates the brakes 4 such that the latter produce braking forces required for standstill.

Figure 3:
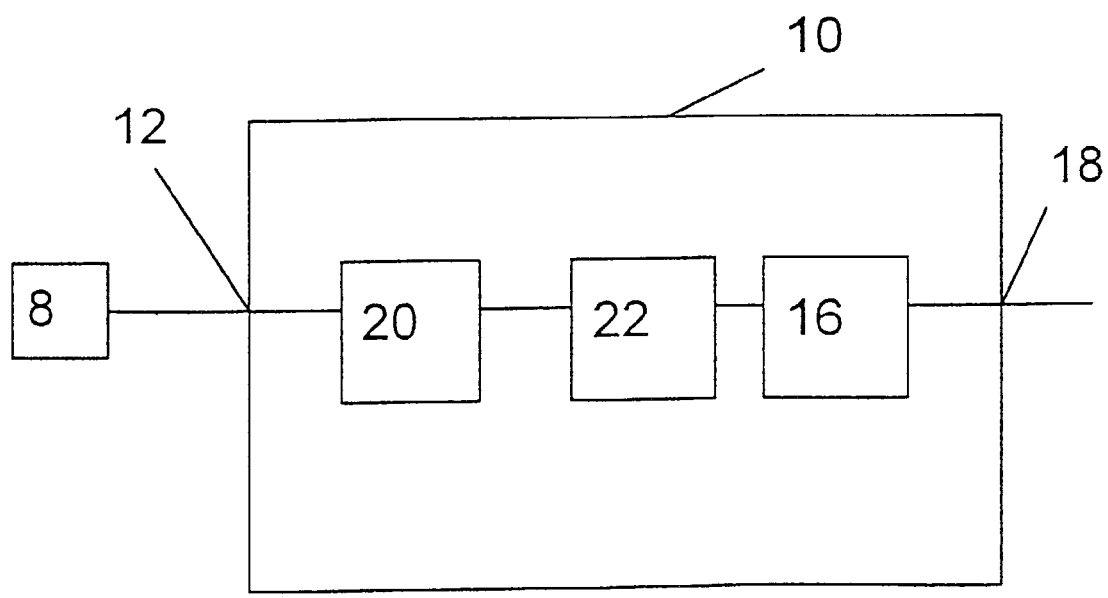
FIG. 3 is an embodiment of a device according to the invention for standstill recognition with a low-pass filter and a high-pass filter.

In the embodiment of the computer unit 10 which is represented in FIG. 3 the band-pass filter 14 is replaced by a low-pass filter 20, which is connected to the input 12, and a high-pass filter 22, which is connected to the low-pass filter 20.

The low-pass filter 20 receives the signal Inc_act from the inclination sensor 8 and, on the basis of an upper cut-off frequency of approximately 4 Hz, delivers a signal Inc_f_tp (i.e. low-pass-filtered inclination in the frequency range) which can only comprise frequency components below 4 Hz. The signal Inc_f_tp which is received by the high-pass filter 22 is filtered at a lower cut-off frequency of approximately 1 Hz in order to deliver a high-pass-filtered signal Inc-f-hp (i.e. high-pass-filtered inclination in the frequency range) which can only comprise frequency components in the frequency range between approximately 1 Hz and 4 Hz which is defined for travelling movements in travelling mode.

As explained with reference to FIG. 2, the evaluation mechanism 16 evaluates the signal Inc_f_hp in order to generate the signal Stat_con indicating that the motor vehicle 1 is at a standstill when the signal Inc_f_hp exhibits substantially no amplitude.

If amplitudes which substantially differ from zero are detected in the signal Inc_f_hp or in the signal Inc_f_bp, the signal Stat_con, which indicates a standstill, is not generated. The absence of this signal indicates to the control unit 6 that the vehicle 1 is travelling rather than at a standstill. A further provision lies in the generation of a signal Dyn_con (i.e. travelling mode) by the evaluation mechanism 16 which indicates a travelling mode for the motor vehicle 1.

The use of the low-pass filter 20 and the high-pass filter 22 instead of the band-pass filter 14 has the advantage of enabling different scanning rates to be used for the low-pass filter 20 and the high-pass filter 22. For example, experimental tests on the above-mentioned type of vehicle have shown that the best results are obtained if the low-pass filter 20 is operated at a scanning rate of 200 Hz (scanning cycle 5 ms) and the high-pass filter 22 at a scanning rate of 10 Hz (scanning cycle 100 ms). The use of the low-pass filter 20 and of the high-pass filter 22 also enables different amplification factors to be predetermined for these filters. Particularly good results can in this respect be achieved if an amplification factor of 60 is predetermined for the high-pass filter 22.

A further advantage of the embodiment according to FIG. 3 lies in the possibility of separately defining the filtering functions for the low-pass filter 20 and the high-pass filter 22 in order to weight the frequency components of the signal Inc_act of the inclination sensor 8 with regard to their importance for standstill recognition.

Hence one embodiment of the low-pass filter 20 employs a band limiting filter (anti-aliasing filter) for filtering the signal Inc_act which is described by the following equation:

$$\text{Inc\_f\_tp} = (1-\exp(-T_A/T)) \times (\text{Inc\_act} - \text{Inc\_f\_tp}_{-1}) \times \text{Inc\_f\_tp}_{-1}$$

Using a previously low-pass-filtered signal $\text{Inc\_f\_tp}_{-1}$, an actual low-pass signal Inc_f_tp is calculated in this function, which describes a recursive filter. Here TA indicates the scanning cycle (e.g. 5 ms), while T corresponds to the reciprocal of the upper cut-off frequency (e.g. approximately 4 Hz) of the low-pass filter 20.

The signal Inc_f_tp which is thus obtained is filtered by the high-pass filter 22, which in this embodiment is described by the following equation:

$$Inc\_f\_hp = K \cdot (Inc\_f\_tp - Inc\_f\_tp_{-1}) + \exp(-T_A/T) \cdot Inc\_f\_hp_{-1}$$

The high-pass filter 22 is in this case also a recursive filter which calculates the actual signal Inc_f_hp using a previously established high-pass-filtered signal $Inc\_f\_hp_{-1}$. Here the parameter TA indicates the scanning cycle (e.g. 100 ms) for the high-pass filter 22, while T corresponds to the lower cut-off frequency (e.g. approximately 1 Hz) of the high-pass filter 22. As stated above, as compared with the low-pass filter 20, an amplification factor which is reproduced by the parameter K (e.g. 60) is used for the high-pass filter 22.

Figure 4:
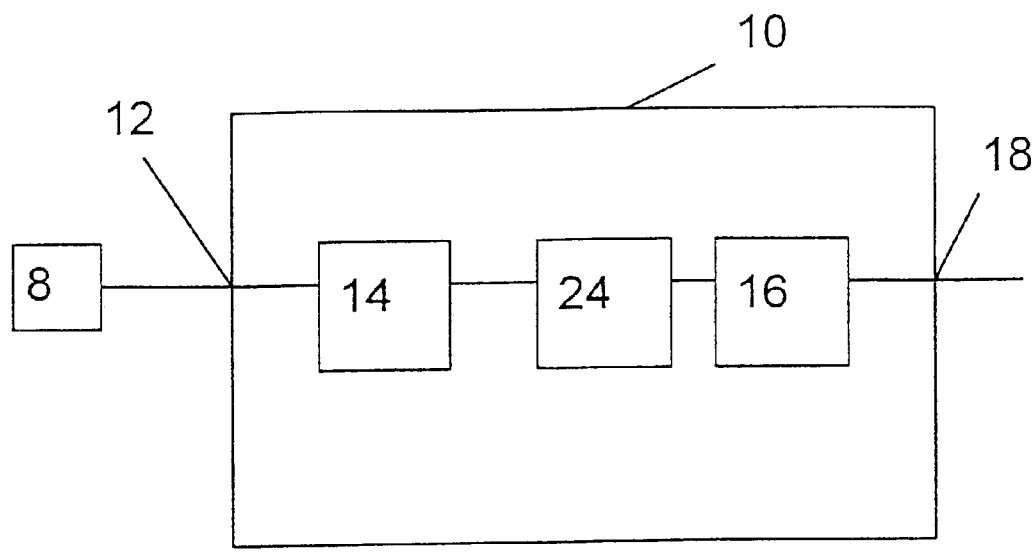
FIG. 4 is an embodiment of a device according to the invention for standstill recognition with a band-pass filter and a differential filter.

The embodiment of the computer unit 10 which is shown in FIG. 4 comprises a filter 24 disposed between the band-pass filter 14 and the evaluation mechanism 16 as an addition to the embodiment according to FIG. 2. The filter 24 is a differential filter for the purpose of preventing frequency components of the signal Inc_f_bp in the frequency range between approximately 1 Hz and 4 Hz, which is defined for vehicle movements in travelling mode, which are not caused by a travelling mode, but rather, for example, by movements/vibrations of the motor vehicle 1 produced by movements occurring in a state of standstill, from being incorrectly detected as travelling mode movements by the evaluation mechanism 16.

The filter 24 is used to establish changes of movement, to be more precise changes of inclination, for the motor vehicle 1 from the signal Inc_f_bp of the band-pass filter 14. A differentially filtered signal Inc_f_abs (i.e. differentiated band-pass-filtered inclination in the frequency range) delivered by the filter 24 is checked by the evaluation mechanism 16 as to whether this signal exceeds or falls below a predetermined limit value or lies within or outside of a predetermined range.

Figure 5:
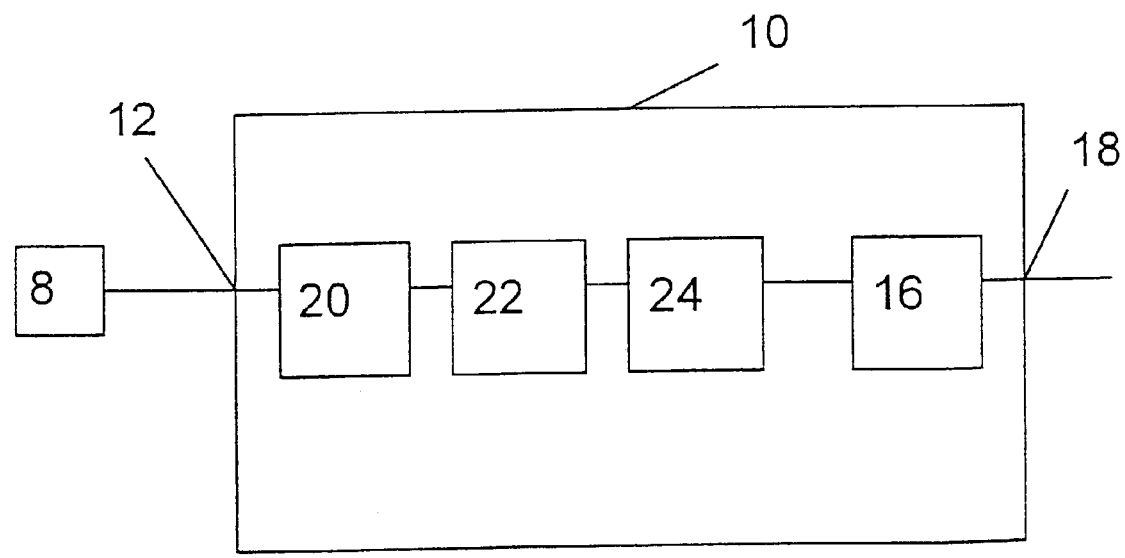
FIG. 5 is an embodiment of a device according to the invention for standstill recognition with low-pass and high-pass filters and a differential filter.

Comparably with FIG. 4, the embodiment of the computer unit 10 which is represented in FIG. 5 comprises the components according to FIG. 3 and the filter 24. In the case of the motor vehicle type which is taken as a basis here, a differential filter has been used in combination with the low-pass and high-pass filters described by the above equations, this differential filter being described by the following equations:

$$\text{for } inc\_f\_abs \leq 0: Inc\_f\_abs = 0$$

$$\text{for } 0 < inc\_f\_bs < X: Inc\_f\_abs = inc\_f\_abs + |Inc\_f\_hp - Inc\_f\_hp_{-1}| - D$$

$$\text{for } X \leq inc\_f\_abs: Inc\_f\_abs = X$$

In these equations the quantity inc_f_abs indicates the differentiated signal Inc_f_hp in the frequency range. The parameter D is a correction value, and the parameter X indicates an upper limit value.

The signal Inc_f_abs which is delivered by the filter 24 has the value 0 when the motor vehicle 1 exhibits no changes of movement or changes of inclination of any kind. The value X is on the other hand delivered when an actual change of movement or change of inclination of the motor vehicle 1 exceeds the limit value defined by X. The signal Inc_f_abs is obtained from the corresponding signal Inc_f_abs less the actual signal Inc_f_hp, the previously established signal $Inc\_f\_hp_{-1}$ and the correction value D for changes of movement or changes of inclination of the motor vehicle 1 between the value 0 and the limit value X.

In the latter case the inclination sensor 8 detects vehicle movements and delivers a corresponding signal Inc_act, the movements detected here generally not being caused by a travelling mode of the motor vehicle 1. The signal Inc_f_abs which is accordingly generated is transmitted to the control unit 6 in order to inform the latter that, although (changes of) movements or (changes of) inclinations have been established for the motor vehicle 1, these do not correspond to movements which are typical of a travelling mode. Depending on the type of control unit 6 and/or control mechanisms for the motor vehicle 1 which are used with this unit, the signal Inc_f_abs can in this case be used in order—if required and/or intended—to determine whether or not the motor vehicle is at a standstill.

If the signal Inc_f_abs has the value 0, the motor vehicle 1 is at a standstill and the control unit 6 accordingly activates the brakes 4 or maintains their state of activation. On the other hand, the control unit 6 deactivates the brakes 4 when the signal Inc_f_abs corresponds to the limit value X.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Method for recognising a state of standstill of a motor vehicle, comprising the following steps:
   specifying at least one change of position parameter which defines a change of position of a motor vehicle which may occur in a travelling state,
   detecting an actual change of position of the motor vehicle,
   establishing at least one actual change of position parameter which characterises the actual change of position,
   comparing the at least one actual change of position parameter with a corresponding one of the at least one specified change of position parameters in order to determine whether the at least one actual change of position parameter characterises a travelling state for the motor vehicle, and
   generating a first signal which reproduces a travelling state for the motor vehicle if the at least one actual change of position parameter characterises a travelling state, or a second signal which reproduces a state of standstill for the motor vehicle if the at least one actual change of position parameter characterises a state of the motor vehicle which is not a travelling state,
   wherein the at least one specified change of position parameter is associated with at least one characteristic chosen from the group comprising: change of inclination of the motor vehicle about its longitudinal axis and change of inclination of the motor vehicle about its transverse axis, and the at least one actual change of position parameter is associated with a change of inclination of the motor vehicle.

2. Method according to claim 1, in which at least one change of position parameter range is specified when specifying the at least one change of position parameter, and when comparing the at least one actual change of position parameter, a check is carried out as to whether the actual change of position parameter lies in a corresponding one of the at least one specified change of position parameter ranges.

3. Method according to claim 1, in which an actual change of position signal is generated which reproduces the actual change of position of the motor vehicle.

4. Method according to claim 3, in which a change of inclination signal is generated as the actual change of position signal.

5. Method according to claim 3, in which the actual change of position signal is low-pass-filtered.

6. Method according to claim 5, in which the low-pass-filtered actual change of position signal is high-pass-filtered.

7. Method according to claim 6, in which the filtering is carried out recursively.

8. Method according to claim 5, in which the actual change of position signal is differentially filtered.

9. Method according to claim 8, in which the filtering is carried out recursively.

10. Method according to claim 5, in which the filtering is carried out recursively.

11. Method according to claim 3, in which the actual change of position signal is band-pass-filtered.

12. Method according to claim 11, in which the actual change of position signal is differentially filtered.

13. Method according to claim 11, in which the filtering is carded out recursively.

14. Method according to claim 3, in which the actual change of position signal is high-pass filtered.

15. Method according to claim 14, in which the actual change of position signal is differentially filtered.

16. Device for recognising a state of standstill of a motor vehicle, comprising:
    an inclination sensor for detecting an actual change of position of a motor vehicle and generating an actual change of position signal, the inclination sensor determining a change of inclination of the motor vehicle about at least one of a longitudinal axis and a transverse axis of the motor vehicle, and
    computer unit for evaluating the actual change of position signal by comparing at least one actual change of position parameter established from the inclination sensor actual change of position signal with at least one specified change of position parameter which defines changes of position of the motor vehicle which may occur in a travelling state, and for delivering a signal which indicates whether or not the motor vehicle is at a standstill.

17. Device according to claim 16, in which the computer unit comprises at least one of a low-pass filter and a high-pass filter.

18. Device according to claim 16, in which the computer unit comprises a band-pass filter.

19. Device according to claim 16, in which the computer unit comprises a differential filter.

20. Device according to claim 16, in which the computer unit comprises a low-pass filter having a first scanning rate and a high-pass filter having a second scanning rate different from the first scanning rate.

21. Device according to claim 16, in which the computer unit comprises a low-pass filter having a first amplification factor and a high-pass filter having a second amplification factor different from the first amplification factor.

22. Device according to claim 16, in which the computer unit comprises a low-pass filter, a high-pass filter, and a differential filter, each of the low-pass filter, high-pass filter, and differential filter having a respective scanning rate and amplification factor, at least of the scanning rate and amplification factor of the differential filter being different from at least one of the scanning rate and amplification factor, respectively, of at least one of the low-pass filter and the high-pass filter.

23. Method for operating braking equipment of a motor vehicle which automatically produces braking forces when the motor vehicle is in a state of standstill in order to hold the motor vehicle at a standstill, this method comprising the following steps:
    specifying at least one change of position parameter which defines a change of position of a motor vehicle which may occur in a travelling state,
    detecting an actual change of position of the motor vehicle,
    establishing at least one actual change of position parameter which characterises the actual change of position,
    comparing the at least one actual change of position parameter with a corresponding one of the at least one specified change of position parameters in order to determine whether the at least one actual change of position parameter characterises a travelling state for the motor vehicle, and
    generating a first signal which reproduces a travelling state for the motor vehicle if the at least one actual change of position parameter characterises a travelling state, or a second signal which reproduces a state of standstill for the motor vehicle if the at least one actual change of position parameter characterises a state of the motor vehicle which is not a travelling state,
    wherein the at least one change of position parameter is associated with at least one of change of inclination of the motor vehicle about its longitudinal axis and change of inclination of the motor vehicle about its transverse axis.

24. Braking equipment for a motor vehicle which automatically produces braking forces for a state of standstill of the motor vehicle in order to hold the motor vehicle at a standstill, this equipment comprising:
    a change of position recognition mechanism for detecting an actual change of position of a motor vehicle and generating an actual change of position signal, the change of position recognition mechanism comprising an inclination sensor for determining a change of inclination of the motor vehicle about at least one of a longitudinal axis and a transverse axis of the motor vehicle; and
    a computer unit for evaluating the actual change of position signal by comparing at least one actual change parameter established from the actual change of position signal with at least one specified change of position parameter which defines changes of position of the motor vehicle which may occur in a travelling state, and for delivering a signal which indicates whether or not the vehicle is at a standstill.

25. Device for recognising a state of standstill of a motor vehicle, comprising:
    inclination sensor means for detecting an actual change of position of a motor vehicle and generating an actual change of position signal; and
    a computer unit for evaluating the actual change of position signal by comparing at least one actual change of position parameter established from the actual change of position signal with at least one specified change of position parameter which defines changes of position of the motor vehicle which may occur in a travelling state, and for delivering a signal which indicates whether or not the motor vehicle is at a standstill.

26. Device for recognising a state of standstill of a motor vehicle, comprising:

specification means for specifying at least one change of position parameter which defines a change of position of a motor vehicle which may occur in a travelling state;

detection means for detecting an actual change of position of the motor vehicle;

establishment means for establishing at least one actual change of position parameter which characterises the actual change of position;

comparison means for comparing the at least one actual change of position parameter with a corresponding one of the at least one specified change of position parameters in order to determine whether the at least one actual change of position parameter characterises a travelling state for the motor vehicle; and generation means for generating a first signal which reproduces a travelling state for the motor vehicle if the at least one actual change of position parameter characterises a travelling state, or a second signal which reproduces a state of standstill for the motor vehicle if the at least one actual change of position parameter characterises a state of the motor vehicle which is not a travelling state;

wherein the at least one change of position parameter is associated with at least one characteristic chosen from the group comprising: change of inclination of the motor vehicle about its longitudinal axis, change of inclination of the motor vehicle about its transverse axis, and change of inclination of the motor vehicle.

27. Method for recognising a state of standstill of a motor vehicle, the method comprising the steps of:

monitoring the inclination of the motor vehicle about at least one of a longitudinal axis and a transverse axis of the motor vehicle;

generating an actual change of position signal upon a change of inclination;

evaluating the actual change of position signal by comparing at least one actual change of position parameter established from the actual change of position signal with at least one specified change of position parameter which defines changes of position of the motor vehicle which may occur in a travelling state; and delivering a signal which indicates whether or not the motor vehicle is at a standstill.

28. Device for recognising a state of standstill of a motor vehicle, comprising:

monitoring means for monitoring the inclination of the motor vehicle about at least one of a longitudinal axis and a transverse axis of the motor vehicle;

generation means for generating an actual change of position signal upon a change of inclination evaluation means for evaluating the actual change of position signal by comparing at least one actual change of position parameter established from the actual change of position signal with at least one specified change of position parameter which defines changes of position of the motor vehicle which may occur in a travelling state; and delivery means for delivering a signal which indicates whether or not the motor vehicle is at a standstill.

29. Device for recognising a state of standstill of a motor vehicle, comprising an inclination sensor for monitoring the inclination of the motor vehicle about at least one of a longitudinal axis and a transverse axis of the motor vehicle, said inclination sensor generating a signal; and an apparatus utilising said signal as an input to recognise when a state of standstill has been reached.

* * * * *